United States Patent
Rietzel

(10) Patent No.: US 8,053,739 B2
(45) Date of Patent: Nov. 8, 2011

(54) PARTICLE BEAM GENERATING SYSTEM AND METHOD WITH MEASUREMENT OF THE BEAM SPOT OF THE PARTICLE BEAM

(75) Inventor: Eike Rietzel, Darmstadt (DE)

(73) Assignee: Siemens Aktiengesellschaft, Munich (DE)

( * ) Notice: Subject to any disclaimer, the term of this patent is extended or adjusted under 35 U.S.C. 154(b) by 183 days.

(21) Appl. No.: 12/489,547

(22) Filed: Jun. 23, 2009

(65) Prior Publication Data
US 2009/0314969 A1 Dec. 24, 2009

(30) Foreign Application Priority Data
Jun. 23, 2008 (DE) .................. 10 2008 029 609

(51) Int. Cl.
*G01T 1/29* (2006.01)

(52) U.S. Cl. .................. 250/385.1; 324/71.3

(58) Field of Classification Search .................. 324/71.3, 324/71.1; 250/385.1
See application file for complete search history.

(56) References Cited

U.S. PATENT DOCUMENTS

| 3,911,280 A | 10/1975 | Hyman et al. |
| 4,392,057 A | 7/1983 | Mathieson et al. |
| 5,025,376 A * | 6/1991 | Bova et al. ............ 378/28 |
| 6,661,013 B2 | 12/2003 | Jagutzki et al. |

FOREIGN PATENT DOCUMENTS

| DE | AT 277403 | 12/1969 |
| JP | 2002015900 A * | 1/2002 |

OTHER PUBLICATIONS

A. B. Gaiduchenko and V. M. Rybin, "Measurement of Differential Parameters of Charged Particle Beams." Measurement Techniques, vol. 36, No. 11, pp. 1229-1235, a translation from Izmeritel'naya Tekhnika, No. 11, pp. 22-25, Nov. 1993. Downloaded Feb. 16, 2011 <doi: 10.1007/BF00978171>.*
"Computed Tomography: From Photon Statistics to Modern Cone-Beam CT," Buzug (2007) pp. 151-200.

* cited by examiner

*Primary Examiner* — Constantine Hannaher
(74) *Attorney, Agent, or Firm* — Schiff Hardin LLP

(57) ABSTRACT

A device to measure the beam spot of a particle beam, has a device that records the projections of the beam spot in many directions that are essentially perpendicular to the direction of the particle beam, and an analysis device that reconstructs a two-dimensional cross section profile of the particle beam from the recorded projections.

10 Claims, 4 Drawing Sheets

PARTICLE BEAM GENERATING SYSTEM AND METHOD WITH MEASUREMENT OF THE BEAM SPOT OF THE PARTICLE BEAM

BACKGROUND OF THE INVENTION

1. Field of the Invention

The invention concerns a device and a method to measure the beam spot of a particle beam and a system to generate a particle beam by means of such a device. The invention is used widely in particle therapy, where the cross section of a particle beam is to be measured.

2. Description of the Prior Art

Particle therapy is an established process to treat tissue, specifically tissue containing tumors. However, irradiation processes used in particle therapy are also used in non-therapeutic applications. This includes, for example, research with particle therapy applied to non-living units or bodies, irradiation of materials, and others. Charged particles, such as protons, carbon ions, or other types of ions are accelerated to high energy levels, bundled into a particle beam and sent to one or more treatment rooms via a high energy beam transport system. The object to be irradiated is irradiated with the particle beam in one of these treatment rooms.

The particle beam is characterized by various parameters. They include, for example, the position and energy level of the particle beam. In addition to these parameters, the beam width—also known as beam focus—is important.

For irradiation, it is often assumed as an ideal that the distribution of particles within the two-dimensional cross section, which is also known as the beam spot, is distributed as a normal distribution. A significant variance from such a normal distribution of the beam spot may have a significant impact on the distribution of the applied dose. Likewise in the case of beam spots that are not normally distributed, which may have different distributions in varying directions, the assumptions regarding the beam spot are critical for the distribution of the applied dose. Thus, it is important to survey the beam spot of a particle beam with precision. This may be done, for example, by regular quality assurance measures.

In order to survey the beam spot, and thus to determine the beam width, radiographic film is usually used today. The film is irradiated with the particle beam, and the pattern registered on the film is then evaluated. However, this process is relatively slow and costly.

In addition, the option of measuring the beam width in so-called multi-wire proportional chambers (MWPC) is known. Such a chamber usually contains a number of wires that are parallel to each other. Wires parallel in one direction facilitate the measurement of the projection of the beam spot in a perpendicular direction. An MWPC often contains two sets of parallel wires that are perpendicular to each other. This permits a measurement of the projection of the beam spot in these two directions.

Furthermore, the option is known to use display screens to measure the beam spot. The beam spot may be measured here directly in two dimensions. However, a disadvantage for quantitative evaluation results from interference from ambient light. Thus, at least the system of the camera and the screen or even the entire room must be darkened.

SUMMARY OF THE INVENTION

An object of the invention is to provide a device and a process to measure the beam spot of a particle beam in a simple, quick, and precise manner. Furthermore, the invention also has the objective of making a system available to generate a particle beam in which a beam spot of the particle beam may be measured simply, quickly and precisely.

The device of the invention to measure a beam spot of a particle beam includes a device that captures the projections of the beam spot in a variety of directions, and an analysis unit that derives a two-dimensional cross section profile of the particle beam from the obtained projections.

The device yields measurement data regarding the projection of the beam spot in one of the directions. If many measurements are obtained regarding the projection of the beam spot in many different directions, it is feasible to reconstruct the two-dimensional cross section profile of the particle beam from the many measurements. The expression of the beam spot as a two-dimensional distribution can thus be determined.

The directions are essentially perpendicular to the direction of the particle beam. The directions are usually perpendicular to the direction of the particle beam, but angles larger or smaller than 90° may also be chosen. In this instance, the cross section profile of the particle beam will be measured with some distortion.

Various processes may be used to reconstruct the two-dimensional cross section profile of the particle beam. Analogous processes are known in computed tomography, for example, where a two-dimensional image is also reconstructed from many one-dimensional projections. Other examples are the Fourier reconstruction, rear projection or filtered rear projection.

A higher number of projections of the beam spot from various directions will lead to a more precise reconstruction of the beam spot. Four projections from various directions suffice to yield a rough and rudimentary reconstruction of a beam spot, but more projections, such as more than 8, more than 10, more than 20 or even more than 40 projections, are advantageous. Ideally, the projections from various directions would cover the entire 360° circle surrounding the direction of the beam.

This device has the advantage that measurement data of the device may be obtained electronically, for example, which would facilitate immediate processing to derive information about the beam spot, specifically about the two-dimensional cross section profile of the particle beam, without requiring that film is developed and evaluated first or that a profile displayed on a screen is first digitalized and then evaluated.

In an embodiment, the device captures the projection of the beam spot in a time-resolved manner. This makes it feasible to reflect potential changes of the cross section profile over time during the process of measuring the beam spot. This is advantageous, for example, in a device such as a particle therapy device in which a particle beam is extracted from an accelerator, where the specification parameters may follow a time pattern, such as may be due to minor variations of the acceleration setting during the extraction or due to the extraction process itself. A time-resolved resolution would be very difficult to achieve with film-based measurement, and may not be feasible at all.

In another embodiment, the device that captures the projections of the beam spot rotates around the direction of the beam. This method facilitates the use of a device that captures the projection of the beam spot in merely a single or possibly just a few directions. It is common to rotate the device around the direction of the beam on a rotation axis that matches the direction of the particle beam. In this way, the particle beam will always project onto the same spot of the device during rotation. However, this is not absolutely required; other eccentric rotation movements, elliptical rotation and others are also feasible. They also permit a rotation of the device around the direction of the beam.

Such a device is a wire chamber, for example, as such devices are used as is well known for the location-resolved detection of ionizing radiation. Strip chambers could also be used. Whereas a physically stationary wire chamber of strip chamber can measure the beam spot merely in one or two directions of projection, a wire chamber or strip chamber that can rotate around the particle beam permits detection in an unlimited number of directions. Moreover, a wire chamber or strip chamber facilitates also the electronic capture of the measurement data. However, it is also feasible to use a stationary wire chamber or strip chamber that can handle a projection of the beam spot in three, four or more directions, if the wire chamber, for example, contains wires in three, four or more wire directions.

However, it is also feasible to link several measurement devices in series, where the several measurement devices can measure the several projections in various directions. For example, it is feasible to use several measurement devices, such as wire chambers or strip chambers, in series that are rotated relative to each other, and which may also rotate jointly, if desired.

It is advantageous to design the device to measure the beam spot as a component of a device that generates a particle beam, such as a particle therapy device. Particularly if the quality assurance measures are completed on a regular basis, the device to measure a beam spot can represent a significant advantage in terms of time and costs.

The device may include a control unit that controls the production of the particle beam and possibly also track the radiation process with the particle beam. It is advantageous to link the control of the device with the control of a device to measure the beam spot simultaneously.

This approach facilitates the rotation of a rotating device automatically and/or synchronized with the requirements of various particle beams with differing specifications. The temporal synchronization could take into account potential modifications of the beam spot during the time period in which the particle beam is active. For example, it is possible to trigger the measurements by a radiation request signal and coordinate them with the radiation process.

It may happen at times that the particle beam changes its shape during a beam extraction that could last for several seconds, for example. If these changes are so quick that not all projections to measure the beam spot can be completed during a specified time period with the precision desired, the following process could nonetheless measure the beam spot with the desired precision and time resolution.

The changes of the particle beam over time are normally essentially equal from one extraction to the next. Various projections are collected during several extractions at the relevant times until all projections required for a reconstruction and relevant to a point in the extraction process have been collected.

This method assures multiple measurements in specified short intervals during the extraction, thus essentially continuously. The stored projections could be linked to a time stamp, for example, that notes the point during the extraction process when the projection was saved. Such a time stamp could be used to sort the projections during a subsequent reconstruction.

Such a device is particularly useful in a particle therapy device for regular quality assurance measures.

The method of the invention for the measurement of beam spots of a particle beam includes the following steps, acquisition of projections of the beam spot in numerous directions, which are in particular essentially perpendicular to the direction of the particle beam, and reconstruction of a two-dimensional cross section profile of the particle beam from the acquired projections.

As with the device, the process permits acquisition of the projections in a time-resolved manner. It is particularly advantageous to derive the projections with a device that can rotate around the direction of the beams, i.e. with a wire chamber or a strip chamber. It is possible here as well to coordinate the timing of the acquisition of the projections with the requirements of the particle beam or the process of radiation with a particle beam.

In contrast to measurements by film, embodiments of the invention do not require long processing periods for development and scanning of films. Moreover, each measurement requires that film is moved, replaced or at least exposed at a different site. This will require much time, if many measurements are intended. In addition, film does not permit a time-resolved measurement, such as for the extraction duration of a particle beam, or does so only at great expense.

Embodiments of the invention also have an advantage over the use of a screen, because some screens have limits on the maximum or minimum intensity, such that the image is washed out or does not display, if the signal is not strong enough. A device that captures projections of the particle beam in merely one direction, as is the case for wire chambers, is capable of measuring a wider dynamic range, such as by way of a suitable adjustment of the amplification of the measurement signals, etc. Such a device also permits measurements below the millisecond range, which facilitates a high degree of temporal resolution that would be difficult or very costly to achieve with cameras.

DESCRIPTION OF THE PREFERRED EMBODIMENTS

Figure 1:
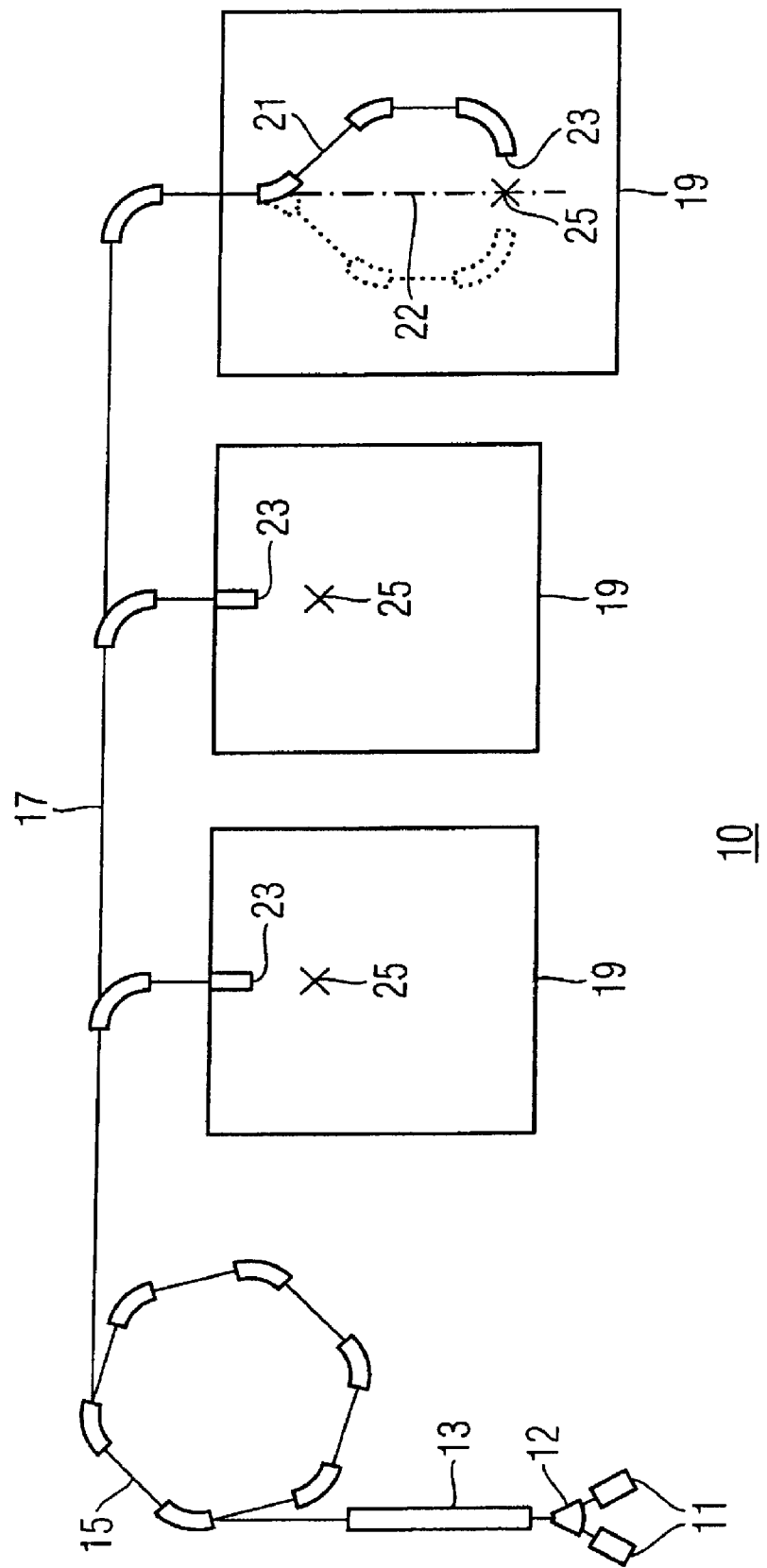
FIG. 1 is a schematic overview of a particle therapy device.

FIG. 1 shows a schematic overview of the structure of particle therapy device 10. Particle therapy device 10 is used specifically to irradiate a body, specifically tissue with a tumor, with a particle beam.

The particles used are primarily ions, such as protons, pions, helium ions, carbon ions or other ion types. Such particles are normally produced in a particle source 11. If there are two particle sources 11, which produce two different types of ions, as shown in FIG. 1, it is feasible to switch quickly from one to the other. This is done by a switch magnet 12, for example, which is positioned between the ion sources 11 and a pre-accelerator 13. For example, such a structure could supply particle therapy device 10 with protons and carbon ions simultaneously.

Ions produced by the ion source 11 or by one of the ion sources 11 and, if applicable, selected by switch magnet 12 are accelerated in pre-accelerator 13 to a first energy level. Pre-accelerator 13 may be embodied as a linear accelerator (LINAC).

The particles are subsequently fed into an accelerator 15, such as a synchrotron or cyclotron. They are accelerated in accelerator 15 to the high energy levels required for irradiation. Once the particles leave accelerator 15, a high energy beam transport system 17 feeds the particle beam to one or more treatment rooms 19. The accelerated particles are beamed onto a body to be irradiated in a treatment room 19. Depending on the design, this may be done in a fixed direction (in so-called "fixed beam" rooms) or from various directions by a rotating gantry 21 that rotates around axis 22.

The particle beam is emitted by beam outlet 23 in treatment room 19 and impacts on a target volume to be irradiated, which is normally located in the isocenter 25 of a treatment room.

The basic structure of particle therapy device 10 depicted in FIG. 1 is an example of such particle therapy devices, but it may also vary from the structure shown.

The embodiments described below are representative of the particle therapy device shown in FIG. 1 as well as other particle therapy devices or generally of devices in which particles are accelerated and formed to a beam, of which the beam spot is to be measured.

Figure 2:
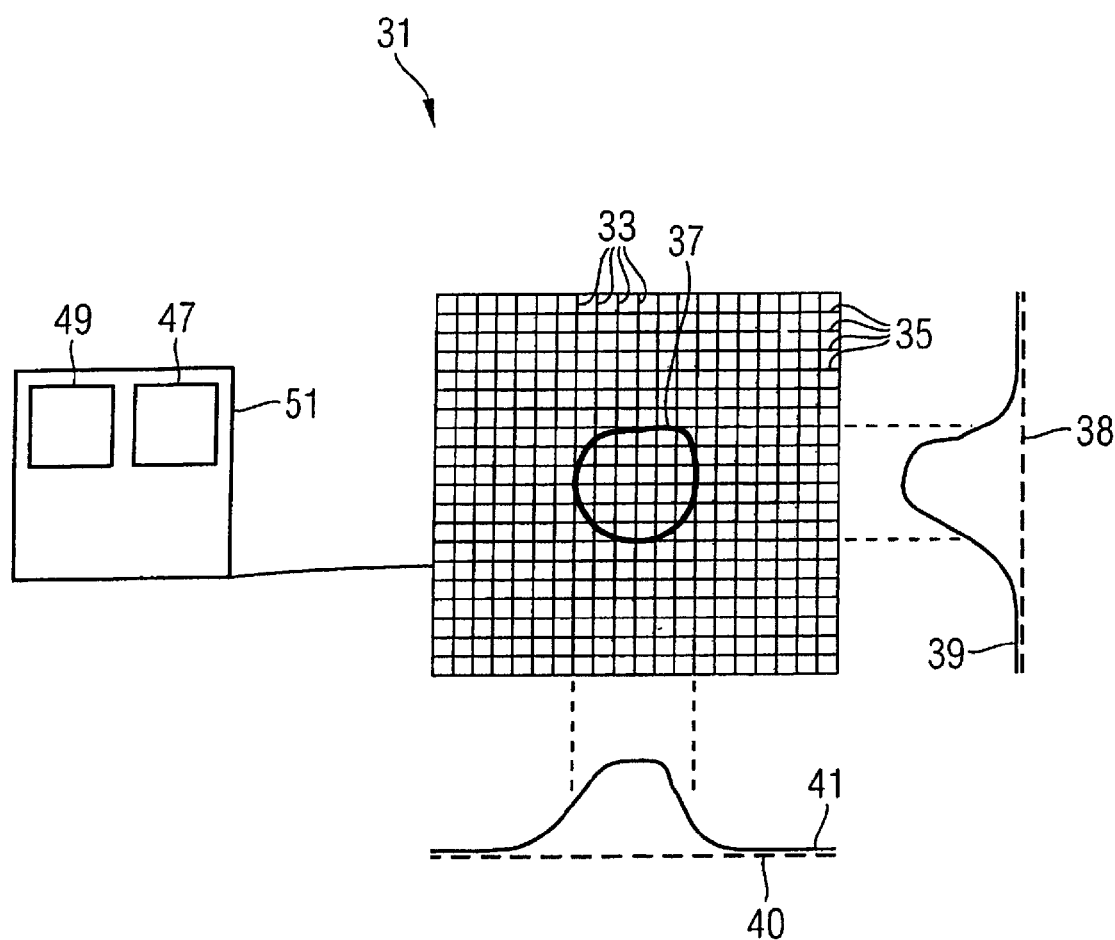
FIG. 2 shows a device embodied as a multi-wire proportional chamber, which rotates around the direction of the particle beam, in a first rotation position.
Figure 3:
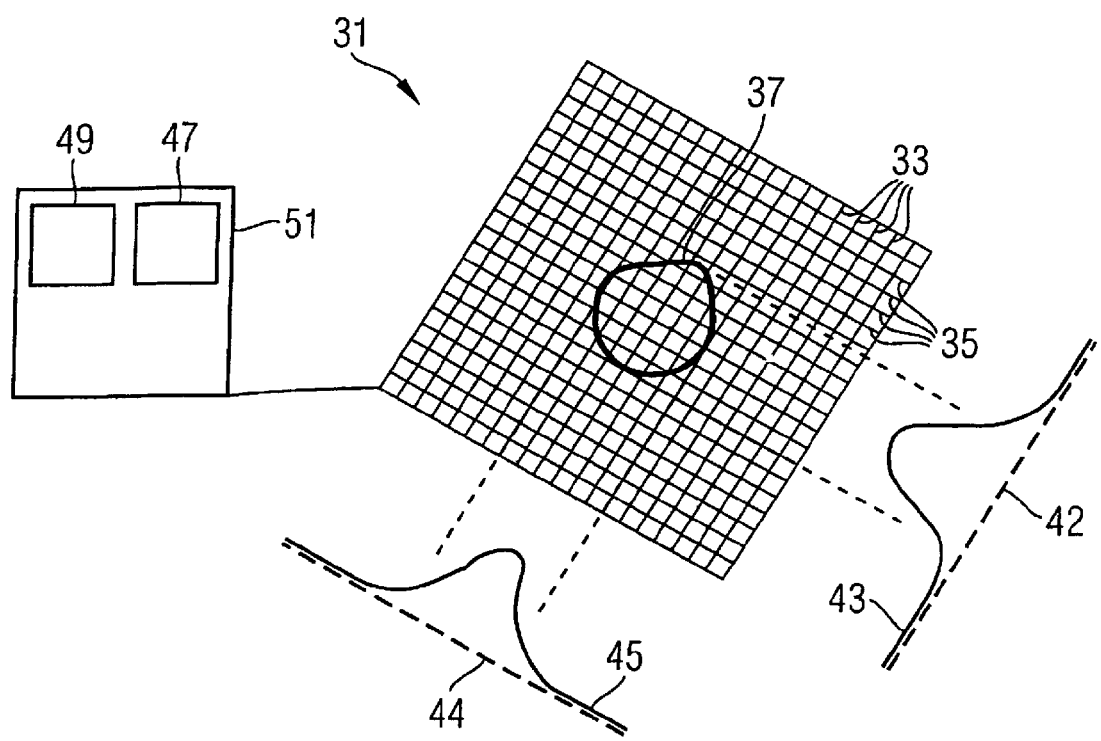
FIG. 3 shows the same multi-wire proportional chamber in a second rotation position.

FIG. 2 and FIG. 3 show in each case a device embodied as a multi-wire proportional chamber 31, where the multi-wire proportional chamber of FIG. 3 is rotated by 30° compared to FIG. 2. The depiction of multi-wire proportional chamber 31 is merely a schematic representation to illustrate the underlying ideas.

Multi-wire proportional chamber 31 includes in this case a first set 33 and a second set 35, each with a large number of parallel wires. The wires of the first set 33 are perpendicular to the wires of the second set 35.

Multi-wire proportional chamber 31 is moved into the particle beam such that the beam impacts vertically on multi-wire proportional chamber 31. This permits a measurement of the cross section profile of the particle beam, i.e. beam spot 37, by means of multi-wire proportional chamber 31.

The wires of one of the two sets 33, 35 yield measurement data that characterize the projection of beam spot 37 in one direction perpendicular to the orientation of these wires. Alternative projection orientations are denoted in FIG. 2 and FIG. 3 with dashed lines 38, 40, 42, 44.

The measurement data are shown in FIG. 2 and FIG. 3 by a slightly skewed normal distribution curve 39, 41, 43, 45 above dashed lines 38, 40, 42, 44. These normal distribution curves 39, 41, 43, 45 denote, for example, the various charges generated and measured in the individual wires of multi-wire proportional chamber 31 by irradiation with the particle beam, from which the cross section profile of the particle beam can be derived.

The measurement data are transmitted to an analysis device 47, which reconstructs the two-dimensional beam spot 37 from the registered measurement data. A rotating multi-wire proportional chamber 31, as depicted in FIG. 2 and FIG. 3, permits the derivation of measurement data for many rotation positions—normally many more rotation positions than are shown in FIG. 2 and FIG. 3. This facilitates the projection of beam spot 37 in a multitude of directions, which in turn leads to a precise reconstruction of the two-dimensional distribution of beam spot 37.

The rotation of multi-wire proportional chamber 31 and the control of the recording of the measurement data will be handled by a control device 49. As shown here, it is feasible to integrate analysis device 47 and control device 49 in a single device 51. But this is not required. It is also feasible to integrate control device 49 and/or analysis device 47 in a control device for particle therapy device 10, such that it will be a simple matter to implement the synchronization of control device 49 for multi-wire proportional chamber 31 with the control device for particle therapy device 10.

For example, the multi-wire proportional chamber 31 may be placed in isocenter 23 of treatment room 19 to be irradiated there with the particle beam. It is also conceivable to design a multi-wire proportional chamber 31 such that it rotates within a beam application and monitoring system (BAMS), which is normally located at the end of high energy beam transport system 17 in the vicinity of the beam outlet.

Known processes, such as filtered rear projection, or processes using a two-dimensional Fourier transformation can be used to derive the cross section profile of the particle beam from the stored measurement data. Such reconstruction processes are described, for example, in the book by Buzug, T. "Computer Tomography. From Photon Statistics to Modern Cone-Beam CT", Springer Berlin, 2007. The reconstruction algorithm may be applied directly or possibly with minor modifications to the present reconstruction of beam spots 37.

Figure 4:
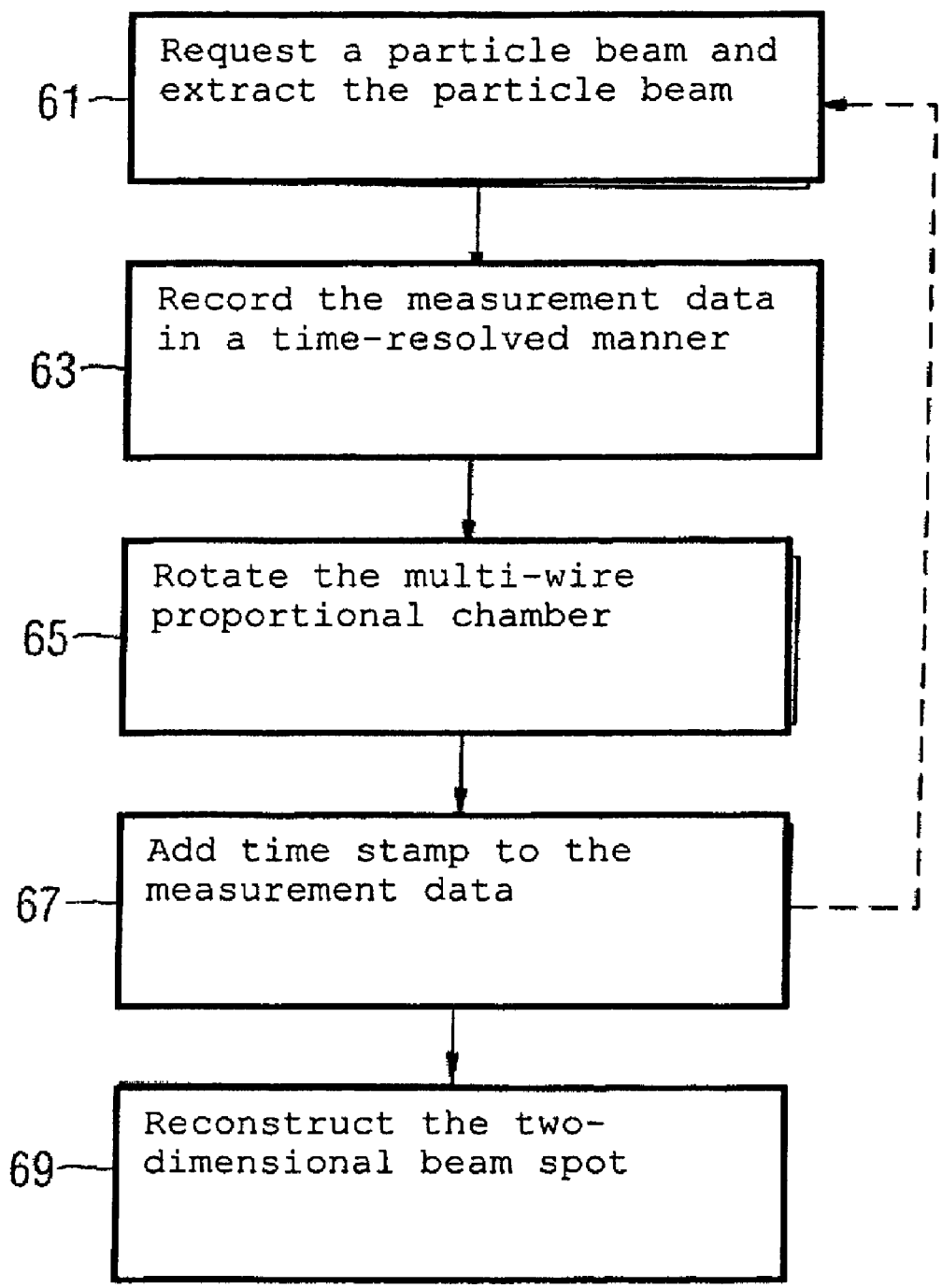
FIG. 4 is a schematic representation of the various process steps of an embodiment of the process.

FIG. 4 shows a schematic overview of the process steps of one embodiment of the process.

First, a particle beam is requested from an accelerator, i.e. a particle beam with certain specifications is extracted from the accelerator in response to a request signal (step 61). The extraction of the particle beam from the accelerator usually takes a few seconds. The request signal triggers also the recording process for measurement data using the multi-wire proportional chamber (step 63). During the recording of measurement data, the multi-wire proportional chamber will be rotated, as indicated in FIG. 2 and FIG. 3 (step 65). The recorded measurement data will also be linked to a time stamp (step 67), such that the measurement data can be sorted by time in order to correlate the measurement data with the progress of the extraction of the particle beam.

If it is not possible to reconstruct the beam spot from the recorded measurement data in a time-resolved manner, as in the case involving a lack of measurement data for some projections, another particle beam with the same specifications will be requested and the recording of measurement data with suitable rotation of the multi-wire proportional chamber will be repeated until the necessary projections for the reconstruction of the beam spot have been recorded for all time steps during the extraction. At that time, the two-dimensional distribution of the beam spot will be reconstructed in a time-resolved manner (step 69).

Although modifications and changes may be suggested by those skilled in the art, it is the intention of the inventors to embody within the patent warranted hereon all changes and modifications as reasonably and properly come within the scope of their contribution to the art.

I claim as my invention:

1. A device for measuring a beam spot of a particle beam, comprising:
    a beam spot recording device that records respective projections of a beam spot of a particle beam in each of a plurality of different directions and links the respective projections with a time stamp that indicates a time at which the respective projection is recorded; and
    an analysis device, provided with said projections, configured to reconstruct a two-dimensional cross-section profile, that changes over time, of said particle beam from the recorded projections, by using the respective time stamps to sort the respective projections according to time.

2. A device as claimed in claim 1 wherein said beam spot recording device records said projections in respective directions that are substantially perpendicular to a direction of propagation of said particle beam.

3. A device as claimed in claim 1 wherein said beam spot recording device is rotatable around a direction of propagation of said particle beam.

4. A device as claimed in claim 1 wherein said beam spot recording device is a device selected from the group consisting of a wire chamber or a strip chamber.

5. A system that generates a particle beam, comprising:
   a particle beam generator that emits a particle beam; and
   a device that measures a beam spot of said particle beam, comprising a beam spot recording device that records respective projections of a beam spot of a particle beam in each of a plurality of different directions and links the respective projections with a time stamp that indicates a time at which the respective projection is recorded, and an analysis device, provided with said projections, configured to reconstruct a two-dimensional cross-section profile, that changes over time, of said particle beam from the recorded projections, by using the respective time stamps to sort the respective projections according to time.

6. A system as claimed in claim 5 comprising a synchronizing circuit that controls operation of said particle beam generator and said device that measures said beam spot, to synchronize timing of generation of said particle beam with measurement of said beam spot.

7. A system as claimed in claim 5 comprising therapy administration components that interact with said particle beam to administer particle beam therapy to a subject.

8. A method for measuring a beam spot of a particle beam, comprising:
   with a beam spot recording device, recording respective projections of a beam spot of a particle beam in each of a plurality of different directions and links the respective projections with a time stamp that indicates a time at which the respective projection is recorded; and
   in a processor provided with said projections, reconstructing a two-dimensional cross-section profile, that changes over time, of said particle beam from the recorded projections, by using the respective time stamps to sort the respective projections according to time.

9. A method as claimed in claim 8 comprising recording said projections with said recording device in respective directions that are substantially perpendicular to a direction of propagation of said particle beam.

10. A method as claimed in claim 8 comprising rotating said beam spot recording device around a direction of propagation of said particle beam when recording said projections.

* * * * *